United States Patent [19]

Wendorf et al.

[11] Patent Number: 5,469,431
[45] Date of Patent: Nov. 21, 1995

[54] METHOD OF AND APPARATUS FOR CHANNEL MAPPING WITH RELATIVE SERVICE IDENTIFICATION

[75] Inventors: James W. Wendorf, Cortlandt Manor; Adam S. Hocek, New York; Kenneth S. Singh, Harriman, all of N.Y.

[73] Assignee: Philips Electronics North America Corp., New York, N.Y.

[21] Appl. No.: 89,961

[22] Filed: Jul. 12, 1993

[51] Int. Cl.$^6$ .................................................. H04J 4/00
[52] U.S. Cl. ........................... 370/50; 370/76; 370/95.1; 455/4.1
[58] Field of Search ................... 370/50, 69.1, 71–73, 370/75, 76, 95.1, 95.3, 97, 110.1; 455/3.1, 4.1, 4.2; 348/3, 6, 10, 17, 473, 906

[56] References Cited

U.S. PATENT DOCUMENTS

| | | | |
|---|---|---|---|
| 4,698,670 | 10/1987 | Matty | 455/4.1 |
| 4,868,811 | 9/1989 | Suzuki | 370/76 |
| 4,922,483 | 5/1990 | Kobayashi | 370/50 |
| 5,200,823 | 4/1993 | Yoneda et al. | 348/473 |
| 5,294,981 | 3/1994 | Yazolino et al. | 348/4 |

Primary Examiner—Benedict V. Safourek
Assistant Examiner—Chau T. Nguyen
Attorney, Agent, or Firm—David R. Treacy

[57] ABSTRACT

The availability and location of a multiplicity of multiplexed digital information streams, transmitted over one of a multiplicity of channels, are identified by transmitting a Global Channel Map which includes a version number, one Band Map Table, one Channel Map Table, and at least as many Service Map tables as there are combinations of identical service types transmitted over different channels. The Band Map Table preferably contains an entry for each frequency band used by the system, and a Band Map Table version number. A Global Channel Map Updates file is transmitted in each band. Where a plurality of channels contain similar-types of services, one Service Map Table contains relative service identification numbers for those service types. The entries for relevant channels in the Channel Map Table contain base service identification data which are combined with the relative service identification number to locate a particular service transmitted over that channel.

19 Claims, 4 Drawing Sheets

FIG. 1

BAND MAP TABLE

| NUMBER OF BANDS 2 BYTES | ENTRY SIZE 1 | OPT. FIELDS 2 | VERS. NO. 1 | | |
|---|---|---|---|---|---|
| BAND NUMBER 2 | FREQUENCY 2 | SYMBOL RATE 2 | FEC TYPE 1 | POLARITY 1 | POSITION 2 |

FIG. 3a

CHANNEL MAP TABLE

| NUMBER OF CHANNELS 2 BYTES | ENTRY SIZE 1 | OPT. FIELDS 2 | | | | |
|---|---|---|---|---|---|---|
| CHANNEL NUMBER 2 | BAND 2 | CHANNEL TYPE 2 | SID BASE 2 | REFERENCE TIME SID 2 | ACCESS CONTROL SID 2 | ALTERNATE CHANNEL 2 | CHANNEL NAME 4 |

FIG. 3b

SERVICE MAP TABLE

| TABLE ID 2 BYTES | NO. OF SVCS. 1 | ENTRY SIZE 1 | OPT. FIELDS 2 | |
|---|---|---|---|---|
| SERVICE TYPE 1 | SERVICE PARAMETERS 2 | CONTROL WORD 1 | SID 2 |

METHOD OF AND APPARATUS FOR CHANNEL MAPPING WITH RELATIVE SERVICE IDENTIFICATION

CROSS-REFERENCE TO RELATED APPLICATIONS

This invention is related to the invention disclosed in application Ser. No. 08/011,936, filed Feb. 1, 1993, now U.S. Pat. No. 5,333,135, by one of the inventors herein.

BACKGROUND OF THE INVENTION

1. Field of the Invention

The invention relates to a method of identifying the availability and the location of information streams, representing services such as data or radio or television signals, transmitted over one of a multiplicity of channels, in which at least one of these channels includes multiplexed information streams corresponding to a plurality of these services.

The invention also relates to an apparatus for transmitting such information streams along with availability and location information, and an apparatus for receiving selected services and identifying others which are available. The invention is particularly applicable to systems for simultaneously transmitting a multiplicity of signals for different services, using a number of different frequency bands, time-division-multiplexed channels in at least some of the bands, and time-division multiplexed services in at least one of the channels. Receivers of different types and capabilities will be used; some may have the capability of processing and utilizing most or all of the different services, while others may be able to utilize only one type of service having different programs or data files available on different channels.

In any systems of this general type, it is often difficult or expensive to provide a user with up-to-date information describing the services now available which this receiver can utilize, and their addresses (band, channel and service identification number).

2. Description of the Prior Art

The use of one channel in a cable TV system, for transmitting a schedule of programs available at that time, and for the next few hours, is well known. However, this requires that the user switch the receiver to the schedule channel, so that viewing of the currently watched program must be interrupted unless the receiver has Picture-in-Picture capability with sufficient legibility. To select a different program from that being watched, the user must use the same channel selector. If a VCR is to be programmed to receive a selected program in the future, in the event that the cable system finds it necessary to change the channel allocation or programming schedule, there is no way that the VCR can automatically reset itself to record the desired material at a different time or via a different channel.

U.S. Pat. No. 4,706,121 provides a broad description of electronic TV guides. However it does not disclose any way to locate a particular program in a multi-layer multiplexing system, such as one having both frequency and time division multiplexing.

U.S. Pat. No. 4,977,455 discloses a system enabling a user to cause a VCR to record program material broadcast at a time in the future, in response to a cue presented on the TV screen during viewing of a primary broadcast, without the viewer directly entering time and channel information into the VCR control. During the primary broadcast, data including the time and channel information for a related future broadcast are multiplexed with the primary broadcast signal. The system decodes the data, to present an on-screen cue to the viewer. The user can cause the system to store the relevant time and channel information, for automatic future recording.

SUMMARY OF THE INVENTION

An object of the invention is to maximize the utilization of spectrum capacity in a multi-service digital transmission system.

Another object of the invention is to accommodate time-varying allocation of channels in a multi-channel, multi-frequency band transmission system.

Yet another object of the invention is to transmit data defining a Global Channel Map, identifying all the services available over the transmission system and their addresses (frequency and time-division-multiplexed location).

A further object of the invention is to provide a highly efficient updating of the Global Channel Map, while minimizing the complexity and required computing capacity of individual receiver systems.

According to the invention, transmission overhead can be minimized by transmitting data, which may be utilized by different receivers while they are accessing different respective services, as a shared parameter available to those receivers without changing to a different frequency or band. For example, a time stamp transmitted over one time-division-multiplexed channel in a frequency band is available to users of all other services being transmitted in that band. Update information regarding channel allocations and service availability or location may be transmitted economically in one channel on each band, while transmission of a complete Global Channel Map is repeated only periodically as a data file on a channel in a band designated as the System Band.

As described in application 08/011936, now U.S. Pat. No. 5,333,135, data files are desirably identified by a service identification number, used by a receiver to locate the corresponding multiplexed data stream. Another form of shared parameter uses respective relative service identification numbers, which identify types of services for which particular files are transmitted over different channels; and a respective base service identification number, found in the Channel Map Table, for each of those channels. The service identification number for a particular specific service is obtained by combining the relative and base service identification numbers. One Service Map Table thus can list a plurality of service types, available over many channels In another embodiment of the invention, version numbers enable a receiver to store and update only those portions of the Global Map Table which are of interest (usable by that receiver). Because the band allocations are seldom changed, the Band Map Table preferably carries its own version number. Thus frequency information can be stored with very infrequent updating or requirement to verify that the information is up to date.

A system according to the invention permits moving of services between channels or bands, where this moving is invisible to the viewer. Merely by selecting the service from a menu, the user causes the receiving system to select the corresponding frequency band and time division multiplexing slot. It is also possible to maximize total transmission of a system, by re-assigning multiplexing time slots and channels or frequency bands during the course of a period of transmission, while making this reassignment user-invisible.

Data defining the change to a Global Channel Map is broadcast prior to the time the change will become effective. If a particular service is being utilized at the time its channel or band change, the receiving system can use the previously transmitted map information to change receiver tuning frequency and/or change demultiplexer settings at the instant the change goes into effect.

DESCRIPTION OF THE PREFERRED EMBODIMENT

Figure 1:
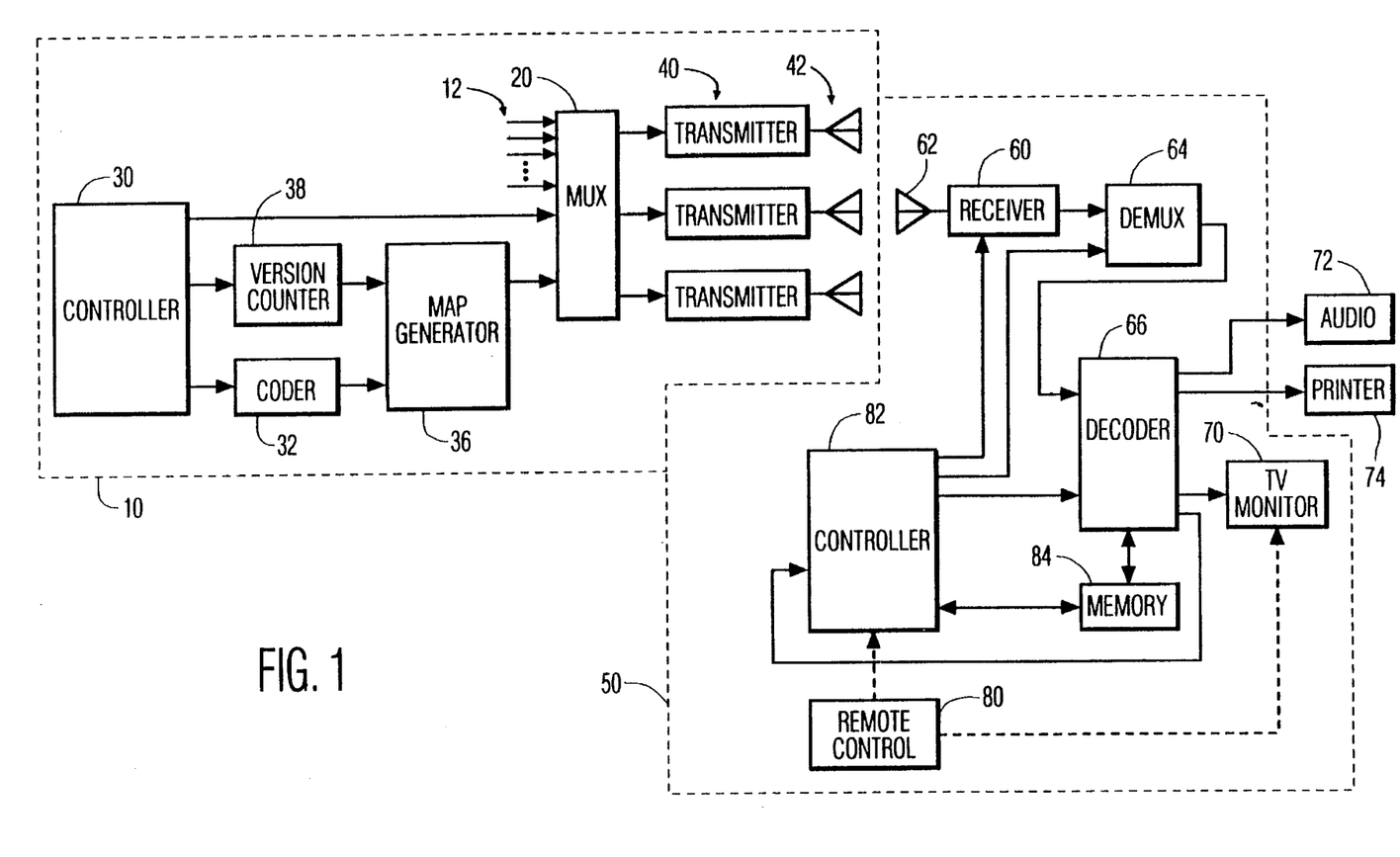
FIG. 1 is a diagram of a system for transmitting and receiving multi-service digital information in accordance with the invention.

The system shown in FIG. 1 is suitable for transmitting a plurality of television programs, radio programs, and data services simultaneously, and receiving and utilizing two or more selected ones of the programs and services, depending on the nature, size and complexity of the receiver. The receiver might itself be the transmitter of a local network which makes only some of these programs and services available for selection by individual users.

A transmitter section 10 receives a number of information streams 12, such as television program signals, radio program signals, and data signals, which are in digital form and may or may not be especially encoded, and processes them in a multiplexer 20. The multiplexer is controlled by a controller 30 which typically includes a microprocessor. The controller directly controls the operation of the multiplexer 20, and controls the generation of availability and location information relating to the information streams transmitted by transmitters 40.

The controller 30 may operate entirely under stored program control, or may also be controlled from a keyboard or a remote device, not shown. Via the multiplexer 20, the controller 30 directly controls the band and channel assignment of the information streams which are allocated in the multiplexer to frequency bands transmitted by respective transmitters 40, and time slots in a time division multiplex arrangement of the bit stream transmitted by one or more of the transmitters 40. Preferably each transmitter 40 operates at a different carrier frequency, identified by a band number. A particular band may accommodate one program requiring most of a 6 MHz bandwidth, plus a plurality of time division multiplexed data services having a smaller bandwidth requirement; or a few fairly large programs; or over 4000 services. In this embodiment each transmitter operates at an ultrahigh frequency for propagation over a radio antenna 42.

In accordance with the invention, the controller 30 also assigns service identification numbers which form part of the header of each information stream, and controls the generation of maps and tables which are also transmitted so that users or receivers can select desired services. As will be described more fully below, a supervisor section allocates band and channel capacity to the various services to be transmitted. To reduce overhead on the transmission channels, certain of the service identification numbers are identified using a coding technique performed in a coder 32 whose output is provided to a map and table generator 36. The map generator re-formats that information into tables to be transmitted. This generator provides data streams to the multiplexer 20, representing a Global Channel Map and Global Channel Map updates, and may also provide a Band Channel Map and Service Map tables as separate data streams for each band.

To simplify up-dating of channel and identifying information stored in individual receivers, a version counter 38 assigns individual version numbers to certain of the maps and tables, for insertion by the map generator 36 in the header of the information stream corresponding to the respective map or table.

The receiver section 50 shown in FIG. 1 is suitable for use in a home which has a multi-signal receiver 60 connected to receive RF signals from an antenna 62, and to provide a digital information stream to a demultiplexer 64. In this embodiment the receiver can receive signals from one band (carrier frequency) only at a time. The demultiplexer output includes one or more particular information streams, such as video and audio signals representing a television program, and optionally also digital signals representing one or more data files. These signals are processed in a decoder 66, if required, and the appropriate information streams are then sent to a television monitor 70 and audio system 72, and, if desired, a printer device 74.

Program and data selection are controlled by a user from a remote control 80 which directly controls a controller 82 that is connected to at least the demultiplexer 64 and a memory 84. In this embodiment the memory stores updated information from the Band Channel Map and Service Map tables, so that the user can switch the output from one program to another, or one data file to another, without any delay. Preferably the memory also stores information from a data file which describes the entertainment programs then being received, or scheduled for the next hour or so, for selective presentation on the screen of the monitor 70.

While the portions of the receiver section 50 have been described as separate assemblies, all except the remote control 80 and the printer 74 may be included in one unit. Alternatively, the receiver 60 may have the capability of processing more than one band simultaneously, and some of the other assemblies may be duplicated at different locations in the home for displaying or providing different programs or data simultaneously.

Digital Transmission Organization

Figure 2:
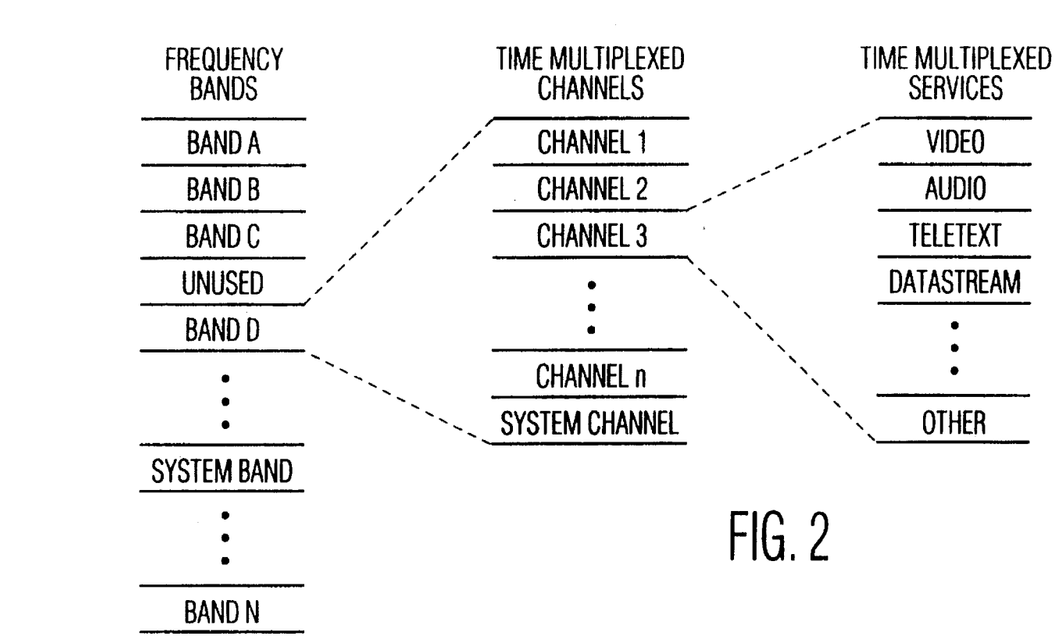
FIG. 2 is a diagrammatic view of band, channel and service organization used by the system of FIG. 1, FIG. 3a, 3b and 3c are header format diagrams for transmitting Band and Channel Map tables.

FIG. 2 is a chart showing a preferred organization of the many information streams which can be transmitted by a digital video transport system, over a VHF, a UHF or microwave radio transmitter system, a cable system, or the like. A portion of the electromagnetic spectrum is divided into bands A ... N, each band having its own carrier frequency. Each band may have a bandwidth of, for example, 6 MHz so that it can carry one or more compressed digital TV programs and a number of lower data rate files, or a relatively large number of data or audio channels.

One of these bands is designated the System Band, and on one of its channels carries a file which is the Global Channel Map. In this embodiment, at least one of the bands carries n+1 time-division multiplexed channels, one channel being designated the System Channel. This channel carries a Global Channel Map Updates file.

Individual channels may themselves be subdivided, by further time division multiplexing, into a number of services which may be related to each other or unrelated. For convenience in selecting the time division multiplexed portions of a given program or file, each file or program may be called a "service" and be assigned its own service identification number (SID), unique in that band, which appears in the header of each packet or information stream portion.

Locating Information

Figure 3A:
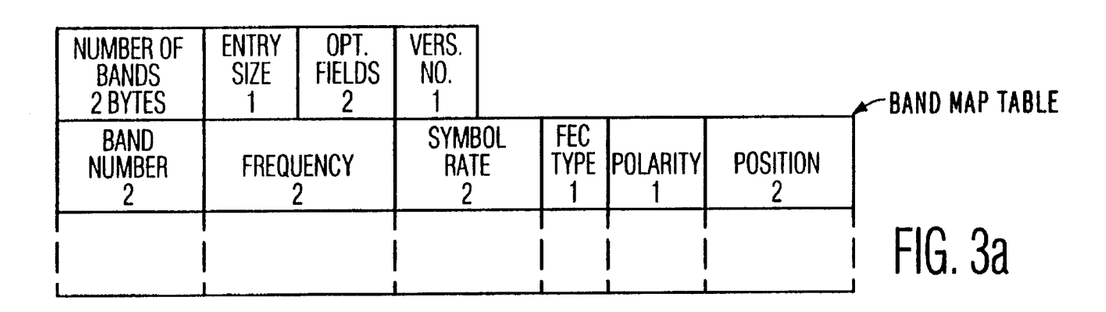
Figures 3B, 3C:
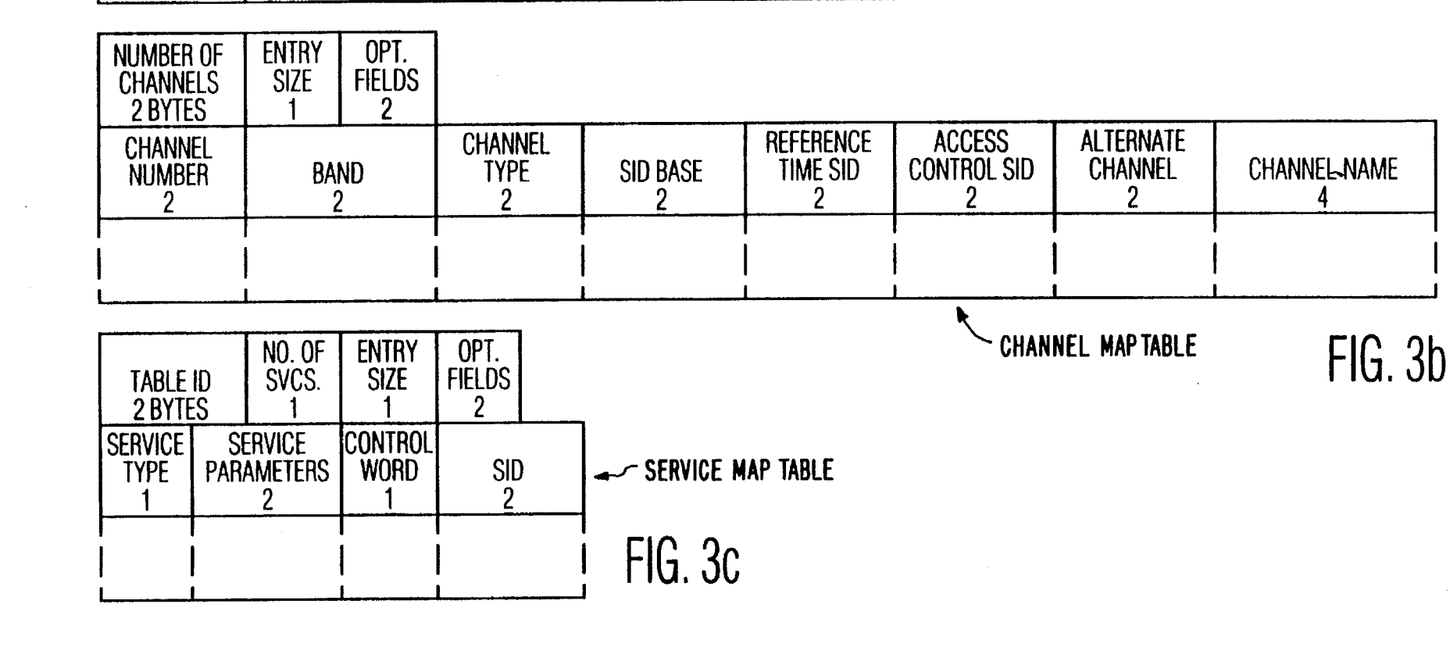

As shown in FIGS. 3a, 3b, and 3c, a listing of all service locations in the digital transport system is contained in a Global Channel Map. This map comprises one complete file or service which is transmitted periodically over the system band. For standardization, this may be assigned SID =0. The Global Channel Map includes one Band Map Table, one Channel Map Table, and (as explained below) at least as many Service Map tables as there are combinations of identical service types transmitted over different channels.

Preferably, the Band Map Table has a header portion which lists the total number of bands, which in the preferred embodiment does not exceed 255 bands; the entry size, or number of bytes in each entry; identification of optional fields in the entries; and the version number. This version number is independent of the version number of the whole map, because changes in the Band Map Table are infrequent. After this header portion, there is an entry for each band or carrier frequency used by the system. Each entry starts with the band number; in cable systems, the band numbers will normally correspond to the traditional channel numbers used in existing analog systems. The next field contains the carrier frequency. In the preferred embodiment, four optional fields may follow: the modem symbol rate for this band; FEC type, the modem forward error correction technique; polarity of the signal, for satellite applications; and satellite position parameters.

In a system such as cable TV, the Band Map Table may have no entries; but for standardization at the receiver, it is preferable that the header, which is only 6 bytes long, is transmitted.

The next part of the Global Channel Map is the Channel Map Table, whose format is shown in FIG. 3b. In any system making significant use of the invention, there will always be entries in this table. It starts with a 5-byte header. For a system having a 1023 channel capacity, a 2-byte field defines the number of channels. This is followed by an entry size field. Depending on optional field inclusion, this may range from 6 to 18 bytes per entry, and is describable by one byte. Two bytes then identify the optional fields to be included: SID Base, Reference Time SID, Access Control SID, Alternate Channel, and Channel Name.

Each channel entry starts with the channel number, occupying 2 bytes; then the band number (2 bytes); then the channel type. This 2-byte field preferably identifies whether the channel is a predefined type, such as an analog, standard NTSC channel; or has loadable data application; or is defined by a Service Map table, in which case the 15 least significant bits preferably specify the Table ID number of the corresponding Service Map table.

The optional SID Base field is a feature of the invention. This is preferably the lowest service identification number (SID) of the set of services (hereinafter sometimes referred to as SIDs) comprising this channel. This number then becomes the reference point for Relative SIDs used in the Service Map tables to identify the SID of the various services transmitted (time division multiplexed) over the channel, or the SID of the first occurring service if services in the channel have consecutive numbers. Through the use of this technique, one Service Map table may be a showed parameter used for a plurality of channels, thus greatly reducing the size of the Global Map Table. If Relative SIDs are used, the SID Base (see FIG. 3b) is the fourth field in the channel entry.

Other preferred option fields are the absolute SID of the service carrying the reference time for this channel, if any (this reference may be another shared parameter); the absolute SID of the service carrying the control word messages (descrambling keys) for services in this channel; the number of the alternate channel to be used if access control does not permit this channel to be accessed; and the channel name, for example the call letters for a television station (4 ASCII characters).

The preferred embodiment permits a system size having 255 bands, carrying a total of up to 1023 channels; and up to 4096 services per band. The services provided in a channel are described in one of the Service Map tables, which may have up to 32 entries for that many services carried over a channel. Thus, even though the entry length of each SID is only one-third the length of a Channel Map Table entry when all options are used, it is important to reduce the number of Service Map tables required. This is done by providing the same combination of service types in a plurality of channels, and describing them by one entry (Table ID). The particular type service desired is then located through use of that Table ID and the SID Base for that channel, both of these being given in the channel's entry in the Channel Map Table.

FIG. 3c shows the format for the Service Map tables. The header includes a 2-byte field for the Table ID number; 1 byte specifying the number of services provided in the channel (preferably no more than 32); 1 byte specifying the number of bytes per entry, preferably 3 to 6 depending on use of optional fields; and 2-byte bit vector specifying the optional fields to be included. Different Service Map tables may have different entry sizes.

Each entry in a Service Map table begins with a 1-byte service type field, preferably identifying the type according the following protocol:

Type Description

0 Unused/Unknown

1 Video

2 Audio

3 Teletext

4 Auxiliary Data

5 Entitlement Control Messages

6 Entitlement Management Messages

7 Datastream File

The second field contains additional parameters further describing the service. The third field is optional, and contains a control word sequence used in descrambling this service.

The last field relates to the same feature of the invention as the SID Base field in the Channel Map Table. This optional field either contains an absolute SID for the service, or a Relative SID which is the offset from the SID Base, or is coded to indicate that the services are provided in order starting with the SID Base for the channel. For example, in a 2-byte SID field, the most significant bit msb=1 may indicate that the 12 least significant bits are the number of an absolute SID. If msb =0, then those lsb's are Relative SIDs whose value is added to the Base SID. If this field is omitted, then it is implicit that the order of the Service Map table entry is its SID offset from a SID Base: the first entry corresponds to SID Base +0, the second to SID Base +1, and so on.

Thus, if a relative SID is used in a particular channel, the third field of the entry for that channel in the Channel Map Table will contain the Table ID in the Service Map Table which lists the particular group of services to be carried. The fourth field of Service Map Table which lists the particular group of services to be carried. The fourth field of the Channel Map Table will contain the base SID which preferably is the SID of the first of those services. The SID for another of services is preferably obtained by adding the relative SID number in the fourth field of the service entry in that Service Map Table.

Up-dating

Most receivers intended for use with a system of the described type have at least some memory for storing information relating to other services, channels or bands. To make it unnecessary for a receiver to scan the system band on a periodic basis, to receive map or table update data, Global Channel Map updates are transmitted over the system channel of each band. Preferably these are transmitted at least 10 seconds before taking effect.

Figure 4:
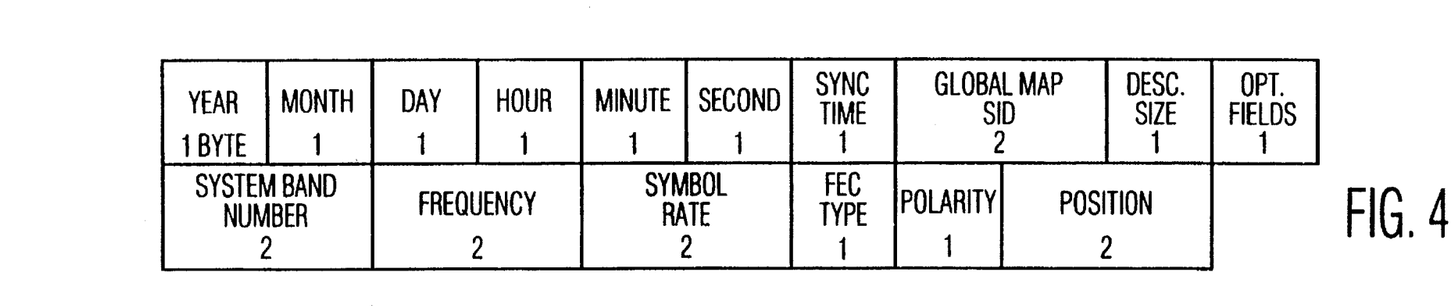
FIG. 4 is a header format diagram for Global Channel Map up-dating.

The Global Channel Map Updates file has its own SID, with a header as shown in FIG. 4, followed by a Band Map Table, Channel Map Table and Service Map tables, each with its own header. These tables have a structure identical to that shown in FIGS. 3a, 3b and 3c, except that their tables may be empty so that only their headers are transmitted. Deleted entries may be indicated by any predetermined convention, such as setting the most significant bit of the band number field, band field, or number of services field equal to a predetermined value.

The Updates File header format shown in FIG. 4 includes the year, month, day, hour, minute and second when the update file is transmitted, and the time in tenths of a second until the update goes into effect. These are followed by the Global Channel Map SID (2 bytes, preferably indicating SID =0); the number of bytes in the descriptor of the System Band (preferably 4 to 10, depending on the number of optional fields used); and a 2-byte bit vector indicating which optional fields are used. This is followed by a System Band description having the format shown in the lower part of FIG. 3a, described above.

Band Map Table updates will ordinarily occur much less frequently than others, so this table has a version number independent of the Global Map Table version number. If "Number of bands" =0, indicating that there are no changes, then the version number will remain unchanged.

The version number of the Global Channel Map updates datastream indicates the version that the Global Channel Map will become when the set of changes takes effect. Update preferably takes effect by transmitting a channel map sync packet on a predetermined SID in the system channel of each band; and beginning to transmit the new version of the Global Channel Map file on the System Band.

Receiver Operation

In a system according to the preferred embodiment of the invention, all the above-described information is transmitted. However, only the larger, more sophisticated receivers will have the capacity to make full use of this information without some delay. For example, the cycle time for the Global Channel Map on the system band may be at least 0.5 sec. This implies a delay of up to this length of time before processing or use of this information can begin.

If a receiver has the capability of receiving only one band at a time, then a common method of operation upon turn-on is to select the same channel and services that were being utilized when the receiver was turned off. A user control action is required to present a menu of other services then available, or a schedule of services to be available in the near future. At that time the receiver may switch automatically to the System Band, receive and process the Global Channel Map during its next cycle of transmission. Some of this information may then be displayed on a TV monitor for user information or selection; or a schedule of future services may be presented after a pre-set SID is selected and received, this latter process possibly involving automatic switching to a different band.

Figure 5:
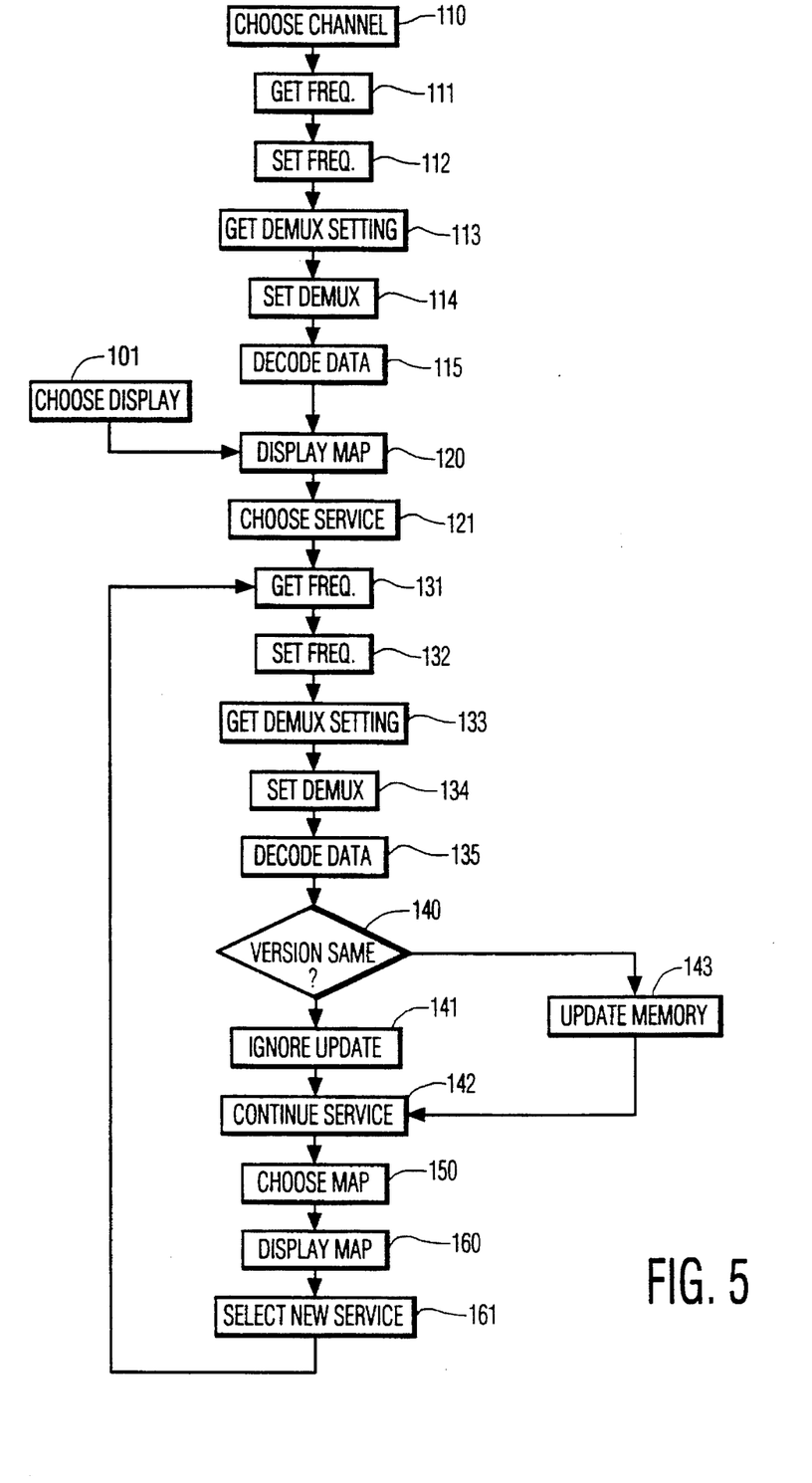
FIG. 5 is a flow chart describing operation of the receiver of FIG. 1.

As shown in FIG. 5, one typical cycle of operation of a receiver section 50 may start with a user wishing to find out what services are available. Through, for example, a remote control, a user requests display of a menu of services of a particular type which are available. Step 101 involves choosing, for example that the menu will be displayed on TV monitor 70. The controller 82 may follow a preprogrammed routine to display the Global Channel Map file, which preferably has a standardized SID. Step 110 involves choosing the channel in the System Band. Step 111 gets the frequency for that band from the Band Channel Map data in memory 84. In step 112 the receiver 60 is tuned. In step 113 the demultiplexer setting is obtained from memory 84, followed by setting the demultiplexer 64 in step 114. After the data file is received, which may involve delay until the next cycle of transmission, in step 115 the decoder 66 converts the coded digital data stream into video suitable for the monitor 70 where, in step 120, the desired map portion is displayed.

In step 121 the user chooses a service from the menu, and inputs the selection to the controller 82. Steps 131 through 135 are identical in function to steps 111–115, except that the receiver section is using the data from the Service Map Table and the Channel Map Table to locate and decode the information constituting the service selected in step 121.

Step 140 is performed when a Channel Map Update is received, or if a routine verification is to be performed. Because such updates may be repeated, in step 140 the version number is compared with the version number stored in memory 84. If the version numbers are the same, in a receiver section 50 having relatively limited processing power in step 141 the update will be ignored, and in step 142 the previously selected service will be continued. In a receiver having extensive processing power, the update may be examined on a byte-by-byte basis to confirm that the stored data are correct. If the version number has changed, in step 143 the contents of memory 84 are updated with respect to the changed map files.

If the user wishes to select a different service, and to view a menu, in step 150 a designation of a service type may be input to controller 82. After processing generally the same as that leading to step 120, in step 160 the desired map portion is displayed. Step 161 is then like step 121, and the cycle continues automatically.

Other embodiments

Those of ordinary skill in the art will recognize that the invention is applicable to many variations of the hardware and steps described above. A small receiver section may not include remote controls, and might be suitable only for display of information or TV programming on a TV receiver screen. In such a set the controller may be programmed to store in the memory 84 only map data and updates regarding TV program channels and related data files. At the cost of a slight delay, the map data for other viewable services can be obtained by tuning to the System Band to receive the Global Map Table during its next cycle of transmission, and then to follow steps 110 to 120 to display the choices available, and steps 131 to 135 to obtain a service.

Optionally, memory 84 may be made large enough so that substantial parts of the Global Channel Map are stored. In another alternative, parts of the Global Channel Map may be transmitted periodically in each band. In yet another variation, the entire Global Channel Map information may not be transmitted over one band; instead, each band may receive the Band Map Table, parts or all of the Channel Map Table, and portions of the Service Map Table applicable to that band only.

At the other end of the complexity spectrum, a master receiver section might serve a plurality of television sets which can individually select desired ones of a large number of services. Such a master may have a sufficiently large number of receiver units 60 to receive most of the bands used by the system. The memory 84 may conveniently store the entire Global Map Table, in which case every new Global Map Update will require updating the memory.

The options described for Global Map Table content are merely exemplary of the preferred embodiment. Practical multi-service systems can be either smaller or larger, and have only some of the functions described, or still others selected by the system designer. Different modulation or multiplexing techniques may be used, depending on the spectrum or reliability requirements.

What is claimed is:

1. A method of identifying availability and location of information streams corresponding to services, respectively transmitted over different ones of a multiplicity of channels, wherein each of a first plurality of said channels includes a second plurality of time-division multiplexed respective information streams corresponding to a second plurality of said services, a given channel of said first plurality of channels being transmitted with a given carrier frequency, comprising transmitting, over a first channel, a global channel map including identification and locating information relating to all said information streams, including in said global channel map a channel map table identifying how each respective one of said multiplicity of channels is transmitted, and a plurality of service map tables containing information identifying the location of multiplexed information streams corresponding to respective groups of said services, said second plurality of said services being one of said groups, and transmitting, in one of said time-division multiplexed information streams included in said given channel, at least one shared parameter containing information for use by receivers receiving and utilizing different ones of said respective services being transmitted with said given carrier frequency, whereby said receivers can use said at least one shared parameter without changing to a different carrier frequency.

2. A method as claimed in claim 1, characterized in that said given channel is different from said first channel, and at least one of said different respective services is transmitted over a channel different from said first channel and said given channel.

3. A method of identifying availability and location of information streams corresponding to services, respectively transmitted over different ones of a multiplicity of channels, wherein each of a first plurality of said channels includes a second plurality of multiplexed respective information streams corresponding to a second plurality of said services, comprising transmitting, over a first channel, a global channel map including identification and locating information relating to all said information streams, including in said global channel map a channel map table identifying how each respective one of said multiplicity of channels is transmitted, and a plurality of service map tables containing information identifying the location of multiplexed information streams corresponding to respective groups of said services, said second plurality of said services being one of said groups, including in said channel map table, for each one of said first plurality of channels, a respective service identification base number related to location of said second plurality of multiplexed information streams in the respective one of said first plurality of channels, including in said service map tables, for each of said second plurality of services, at least a code bit identifying a relationship between the respective said service identification base number for each of said first plurality of said channels and the locations of the respective multiplexed information streams, corresponding to said second plurality of services, in the respective ones of the first plurality of channels, and transmitting at least one shared parameter containing information for use by receivers receiving and utilizing different ones of said respective services.

4. A method as claimed in claim 3, characterized in that said at least one code bit comprises a respective relative service identification number, and comprising the steps of identifying each of said information streams by a respective service identification number, and in a particular one of said first plurality of channels, basing said respective service identification numbers identifying individual ones of said second plurality of multiplexed respective information streams on a combination of the service identification base number for said particular one channel and the respective relative service identification number for the respective service, said at least one code bit being one said shared parameter.

5. A method as claimed in claim 3, characterized in that said at least one code bit comprises a respective relative service identification number, and comprising the steps of identifying each of said information streams by a respective service identification number, and in a particular one of said first plurality of channels, identifying individual ones of said second plurality of multiplexed respective information streams by assigning respective service identification numbers equal to the sum of the service identification base number for said particular one channel and the respective relative service identification number for the respective service.

6. A method as claimed in claim 3, comprising the step of identifying each of said information streams by a respective service identification number, characterized in that a given value of said code bit indicates that the respective information streams for said second plurality of services have consecutive service identification numbers starting with said service identification base number.

7. A method as claimed in claim 3, wherein respective information streams are transmitted simultaneously over a plurality of bands, at least one of said bands being a digital band, each band including at least a respective one of said multiplicity of channels, comprising the steps of including in said global channel map a band map table identifying the transmission characteristics of each band, and identifying in said channel map table the respective band in which each channel is transmitted, transmitting said first channel over a first of said bands, transmitting one of said first plurality of channels including multiplexed information streams in a given one of said bands, including in said global channel map a global channel map version number, updating said global channel map as required, and incrementing said global channel map version number whenever the global channel map is updated, transmitting, over at least one band different from said first of said bands, a global channel map update identifying changes to said global channel map, and including in updates to said band map table a band map version number independent of said global channel map version number, and updating said band map table as required, and incrementing said band map version number whenever the band map table is updated.

8. A method as claimed in claim 7, characterized in that each said band is a frequency band transmitted with a carrier frequency different from other bands being transmitted.

9. A method as claimed in claim 8, characterized in that each digital band includes a respective system channel over which said global channel map updates are transmitted, each global channel map update including the incremented version number of the update.

10. A method as claimed in claim 9, wherein the respective said at least one of said bands includes a plurality of channels including at least one of said first plurality of said channels, which are time division multiplexed, and the corresponding second plurality of services are time division multiplexed within said one of said first plurality of said channels.

11. A method of identifying availability and location of information streams corresponding to services, respectively transmitted over different ones of a multiplicity of channels, wherein at least one of said channels includes a multiplexed plurality of said information streams corresponding to a plurality of said services, wherein respective information streams are transmitted simultaneously over different ones of a plurality of bands, each band including at least a respective one of said channels, comprising the steps of transmitting, over a first channel, a global channel map including identification and locating information relating to all said information streams, and a global map version number which is changed whenever the content of said global channel map is changed, including in said global channel map a channel map table identifying the respective band in which each channel is transmitted, and a plurality of service map tables, including in each of said plurality of service map tables a respective service map version number which is changed whenever the content of said service map table is changed, including in a given one of said service map tables information identifying the location of said multiplexed plurality of said information streams in said at least one of said channels, transmitting, over a second channel, update information whenever the content of said global channel map is changed, transmitting said first channel over a first of said bands, transmitting said one of said channels including multiplexed information streams in a given one of said bands, identifying a channel in said given one of said bands as a system channel, and transmitting in said system channel a band channel map comprising channel entries and corresponding said service map tables for said given one of said bands, and including in said band channel map a version number the same as the version number of said global channel map.

12. A method as claimed in claim 11, wherein each band is transmitted over a respective frequency different from other bands, comprising the further steps of including in said global channel map a band map table identifying the respective frequency of each band, including in said band map table a band map version number independent of the global channel map version number, including in each band a respective said system channel, and transmitting global channel map updates in each respective said system channel.

13. A method as claimed in claim 12, wherein the respective channels transmitted in one band are time division multiplexed, and said plurality of services included in said at least one of said channels are time division multiplexed within said one of said channels.

14. A transmitter for transmitting digital signals for a multiplicity of services including a plurality of wide bandwidth information streams and a plurality of narrower bandwidth data streams, comprising means for transmitting said digital signals representing respective services over predetermined ones of a multiplicity of channels, each respective channel being transmitted over a predetermined one of a plurality of bands having mutually different transmission characteristics, means for identifying availability and location of said wide bandwidth information streams and said narrower bandwidth data streams transmitted over each of said multiplicity of channels, wherein each of a first plurality of said channels includes a second plurality of multiplexed respective information streams corresponding to a second plurality of said narrower bandwidth data streams, comprising means for transmitting, over a first channel, a global channel map including identification and locating information relating to said wide bandwidth information streams and said narrower bandwidth data streams, said global channel map including a channel map table identifying the band in which each respective channel is transmitted, and a plurality of service map tables containing information identifying the location of said multiplexed respective information streams corresponding to the respective service, means for including in said channel map table, for each of said first plurality of said channels, a respective service identification base number related to location of said second plurality of multiplexed respective information streams in the respective one of said first plurality of channels; and for including in said service map tables, for each of a second plurality of services corresponding to said second plurality of multiplexed respective information steams, at least a code bit identifying a relationship between the respective one of said service identification base numbers for each of said first plurality of said channels and the locations of the respective multiplexed information streams, corresponding to said second plurality of services, in the respective ones of the first plurality of channels.

15. A receiver for receiving and utilizing a selected one of a multiplicity of services transmitted as digital information streams, said digital information streams including a plurality of wide bandwidth information streams and a plurality of narrower bandwidth data streams, transmitted over predetermined ones of a multiplicity of channels, each respective channel being transmitted over a predetermined one of a plurality of bands having mutually different transmission characteristics, each of said digital information streams corresponding to a respective service having a service identification number transmitted therewith, said narrower bandwidth data streams including a channel map table and service map tables identifying availability and location of said digital information streams in said channels and bands, and each of a first plurality of said channels including a second plurality of multiplexed respective information streams corresponding to a second plurality of services, wherein said receiver comprises means for receiving, over a first channel, a global channel map of identification and locating information relating to said digital information streams, said global channel map including a channel map table identifying how each respective channel is transmitted, and a plurality of service map tables containing information identifying the location of multiplexed information streams corresponding to respective ones of said multiplicity of services, means for obtaining from said channel map table, for each of said first plurality of channels, a respective service identification base number related to location of said second plurality of multiplexed information streams in the respective one of said first plurality of channels, means for obtaining from said service map tables, for each of said second plurality of services, at least a code bit identifying a relationship between the respective one said service identification base numbers for each of said first plurality of said channels and the locations of the respective multiplexed information streams, corresponding to said second plurality of services, in the respective ones of the first plurality of channels, control means for selecting at least a selected one of said multiplicity of services, and demultiplexing means, responsive to said control means, for providing the information stream corresponding to said at least a selected one of said multiplicity of services.

16. A receiver as claimed in claim 15, characterized in that said at least a code bit comprises a respective relative service identification number, and said receiver comprises means, responsive to said information stream being in a particular one of said first plurality of channels, for determining values of said respective service identification numbers identifying individual ones of said second plurality of multiplexed respective information streams based on a combination of the service identification base number for said particular one of said channels and the respective relative service identification number for the respective services corresponding to said individual ones.

17. A receiver as claimed in claim 15, characterized in that said at least a code bit comprises a respective relative service identification number, and said receiver comprises means, responsive to said information stream being in a particular one of said first plurality of channels, for determining values of said respective service identification numbers identifying individual ones of said second plurality of multiplexed respective information streams based on the sum of the service identification base number for said particular one of said channels and the respective relative service identification number for the respective services corresponding to said individual ones.

18. A receiver as claimed in claim 15, characterized in that a given value of said code bit indicates that the respective information streams for said second plurality of services have consecutive service identification numbers starting with said service identification base number, and said receiver comprises means, responsive to said information stream being in a particular one of said first plurality of channels, and said at least one bit having a given characteristic, for determining values of said respective service identification numbers identifying individual ones of said second plurality of multiplexed respective information streams based on a combination of the service identification base number for said particular one of said channels and the sequence position of an entry identifying the respective 19. A receiver as claimed in claim 15, wherein said mutually different transmission characteristics are mutually different carrier frequencies, said global channel map includes a global channel map version number, a band map table identifying the respective carrier frequency of each band, a band map table version number independent of said global channel map version number, and a channel map table identifying the respective band in which each of said multiplicity of channels is transmitted, each band has a system channel over which global channel map updates are transmitted whenever the global channel map is to be updated and the version number is to be incremented, and said receiver comprises memory means for storing information transmitted as part of said global channel map, including said version numbers, and means for updating stored information relating to said channel map and service map tables responsive to receipt of a global channel map update having a global channel map version number greater than the corresponding stored number, and for updating stored information relating to said band map table only responsive to receipt of a global channel map update including a band map table version number greater than the corresponding stored number.

* * * * *